United States Patent
Lee

(10) Patent No.: US 8,448,847 B2
(45) Date of Patent: May 28, 2013

(54) HOST APPARATUS AND METHOD FOR LINKING WITH NETWORK IMAGE CAPTURE APPARATUS

(75) Inventor: Chain-Wu Lee, Taipei (TW)

(73) Assignee: AVer Information Inc., Taipei (TW)

( * ) Notice: Subject to any disclaimer, the term of this patent is extended or adjusted under 35 U.S.C. 154(b) by 206 days.

(21) Appl. No.: 13/004,664

(22) Filed: Jan. 11, 2011

(65) Prior Publication Data
US 2012/0175411 A1    Jul. 12, 2012

(51) Int. Cl.
*G06K 19/06* (2006.01)
(52) U.S. Cl.
CPC ...................................... *G06K 19/06* (2013.01)
USPC .......................................... 235/375; 235/492
(58) Field of Classification Search
USPC ................. 235/375, 486, 487, 492, 380, 382, 235/472.01–472.03, 462.01, 493
See application file for complete search history.

(56) References Cited

U.S. PATENT DOCUMENTS

| 2002/0040926 A1 | 4/2002 | Bock |
| 2007/0087732 A1* | 4/2007 | Hsueh .......................... 455/414.4 |
| 2008/0277466 A1* | 11/2008 | Dohm et al. ................... 235/382 |
| 2012/0162515 A1* | 6/2012 | Lee et al. ....................... 348/563 |

\* cited by examiner

*Primary Examiner* — Thien M Le
(74) *Attorney, Agent, or Firm* — Kirton McConkie; Evan R. Witt

(57) ABSTRACT

In a method for linking with a network image capture apparatus provided by the present invention, a tag having a tag information equipped on the network image capture apparatus is provided. The tag information contains a plurality of identification data of the network image capture apparatus. Then, the network image capture apparatus is attempted to link with a network. When the network image capture apparatus is linked with the network and broadcasts a beacon packet on the network, an image transmission link is established according to the beacon packet and the tag information.

12 Claims, 6 Drawing Sheets

HOST APPARATUS AND METHOD FOR LINKING WITH NETWORK IMAGE CAPTURE APPARATUS

FIELD OF THE INVENTION

The present invention generally relates to a linking method, and more particularly to method for establishing a transmission link between a host apparatus and a network image capture apparatus such as network camera.

BACKGROUND OF THE INVENTION

Currently, the demand for environment security system is grown year by year. Along with expansion of industrial scale and development of the enterprise globalization, people need to monitor some points at far-end is becoming a trend being obvious day by day. In addition, since the environment of investment is varied, entrepreneurs are prone to set up factories abroad, so that the requirement of far-end monitoring is potentially increased. Due to the digital signal has some advantages of easy to save and high anti-noise ratio, a video recording system using a digital network as transmission channel has gradually become the mainstream of far-end monitoring.

In the conventional network video recording system, the link set up between a network video recording apparatus and network cameras needs an user firstly to set each of the network cameras and handwrite information such as a serial number and a password etc., of each of the network cameras. Then, the user is needed to input the handwritten information into the network video recording apparatus, for facilitating the transmission link to be established between the network video recording apparatus and each of the network cameras.

As above description, the conventional link set up between a host apparatus (e.g., the network video recording apparatus) and the network cameras is very unfriendly for some users without information skill, so that many mistakes may occur during setting the respective network cameras. In addition, in the conventional step of inputting the information of the network cameras into the network video recording apparatus may be that a user firstly checks the related information on the respective network cameras, and then tells another user about the related information at the host end through some means such as voice communication or text message. Accordingly, the related information is easy to be intercepted and recorded, causing insufficient information security.

SUMMARY OF THE INVENTION

Therefore, the present invention is directed to a host apparatus, which can establish a linking with an image capture apparatus through a network.

The present further is directed to a method for linking with a network image capture apparatus, which can establish a linking with a network image capture apparatus by simple and safe means.

More specifically, a host apparatus in accordance with an embodiment of the present invention is adapted for linking with a tag scanner and an image capture apparatus. The host apparatus comprises a control module, a data exchange interface module, a storage unit and a link module. The data exchange interface module is for linking the control module with the tag scanner, obtaining a tag information from a tag equipped on the image capture apparatus through the tag scanner and sending the tag information to the control module. When the control module receives the tag information, the tag information is transmitted to be stored in the storage unit. In addition, the link module is coupled to the control module and for linking with a network. When the image capture apparatus is linked with the network and broadcasts a beacon packet on the network, the link module obtains the beacon packet from the network and sends the obtained beacon packet to the control module. Therefore, the control module can control to establish an image transmission link between the host apparatus and the image capture apparatus according to the beacon packet and the tag information stored in the storage unit.

In one embodiment of the present invention, the tag scanner is a barcode scanner, and the tag is a two-dimensional barcode. In another embodiment, the tag scanner is a radio frequency identification (RFID) reader, and the tag is a RFID tag.

From another viewpoint, a method for linking with a network image capture apparatus in accordance with an embodiment of the present invention is provided. In the method, a tag having a tag information is provided on the network image capture apparatus, and the tag information contains a plurality of identification data of the network image capture apparatus. Then, is the network image capture apparatus is attempted to link with a network. When the network image capture apparatus is linked to the network and broadcasts a beacon packet, an image transmission link with the network image capture apparatus is established according to the beacon packet and the tag information.

Since the embodiments of the present invention use the tag scanner to obtain the tag information of the tag equipped on the network image capture apparatus in contactless manner and then establish the image transmission link with the network image capture apparatus, the present invention can simplify the steps of set associated with the prior art and improve information security.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
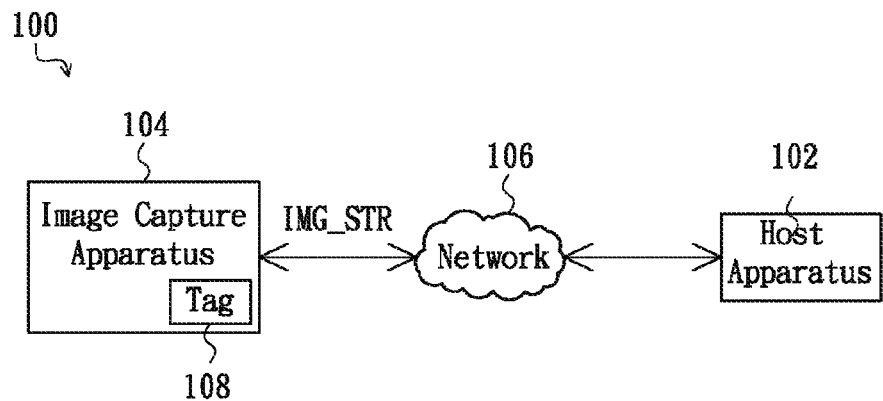
FIG. 1 shows a schematic block diagram of a monitor system according to a preferred embodiment of the present invention.

FIG. 1 shows a schematic block diagram of a monitor system according to a preferred embodiment of the present invention. As illustrated in FIG. 1, the monitor system 100 in accordance with the exemplary embodiment comprises a host apparatus 102 and an image capture apparatus 104. The host apparatus 102 can be a network camera, but it is not to limit the present invention. Correspondingly, the image capture apparatus 104 can be a network video recording apparatus. Therefore, the host apparatus 102 can establish an image transmission link with the image capture apparatus 104 through a network 106. In this exemplary embodiment, the network 106 is, for example, a local area network (LAN) or the internet.

The image capture apparatus 104 can capture an image in a predetermined range and generate a real-time image stream IMG_STR. After the host apparatus 102 has established the image transmission link with the image capture apparatus 104, the host apparatus 102 can receive the real-time image stream IMG_STR generated by the image capture apparatus 104 through the network 106, and then store the real-time image stream IMG_STR as an image data.

Moreover, the image capture apparatus 104 of the exemplary embodiment is equipped with a tag 108. In some embodiments, the tag 108 can be a barcode such as one-dimensional barcode or two-dimensional barcode. In other embodiments, the tag 108 can be implemented by a radio frequency identification (RFID) tag. In addition, the tag 108 records a plurality of identification data of the image capture apparatus 104 such as a machine serial number, a brand code, a model number and a security code.

Figure 2:
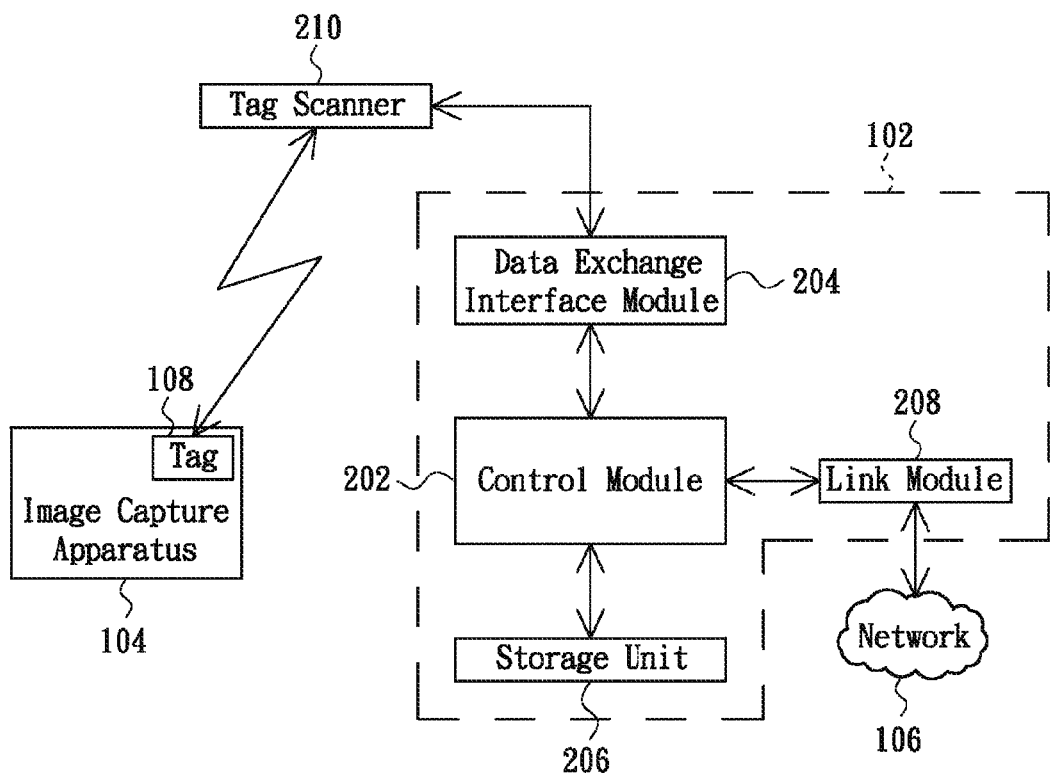
FIG. 2 shows a schematic system block diagram of a host apparatus according to a preferred embodiment of the present invention.

FIG. 2 shows a schematic system block diagram of the host apparatus according to a preferred embodiment of the present invention. As illustrated in FIG. 2, in the host apparatus 102 of the exemplary embodiment, a control module 202 is coupled to a data exchange interface module 204, a storage unit 206 and a link module 208. In this exemplary embodiment, the data exchange interface module 204 may have at least one connection interface such as a USB interface, and further can be coupled to a tag scanner 210. When the tag scanner 210 is linked to the data exchange interface module 204, the control module 202 identifies the tag scanner 210 as an input device for example a keyboard. Furthermore, the storage unit 206 can be a hard disk (HDD), and the link module 208 can link with the network 106.

Before establishing an image transmission link between the host apparatus 102 and the image capture apparatus 104, the user can firstly use the tag scanner 210 to scan the tag 108 equipped on the image capture apparatus 104, so as to read the tag information of the tag 108 in a contactless manner. Meanwhile, the control module 202 can obtain the tag information of the tag 108 through the data exchange interface module 206 and send the obtained tag information to be stored in the storage unit 206. In this exemplary embodiment, the tag scanner 210 can be a barcode scanner or a RFID reader for matching with the type of the tag 108.

When the image capture apparatus 104 is linked with the network 106 and broadcasts a beacon packet on the network 106, the link module 208 obtains the beacon packet from the network 106 and transmits the beacon packet to the control module 202. Therefore, the control module 202 would establish the image transmission link between the host apparatus 102 and image capture apparatus 104 according to the tag information stored in the storage unit 206 and the beacon packet obtained by the link module 208. In this exemplary embodiment, the beacon packet contains a machine serial number, a network address, a first random serial number, and a cyclic redundancy check (CRC) code of the image capture apparatus 204.

Figure 3:
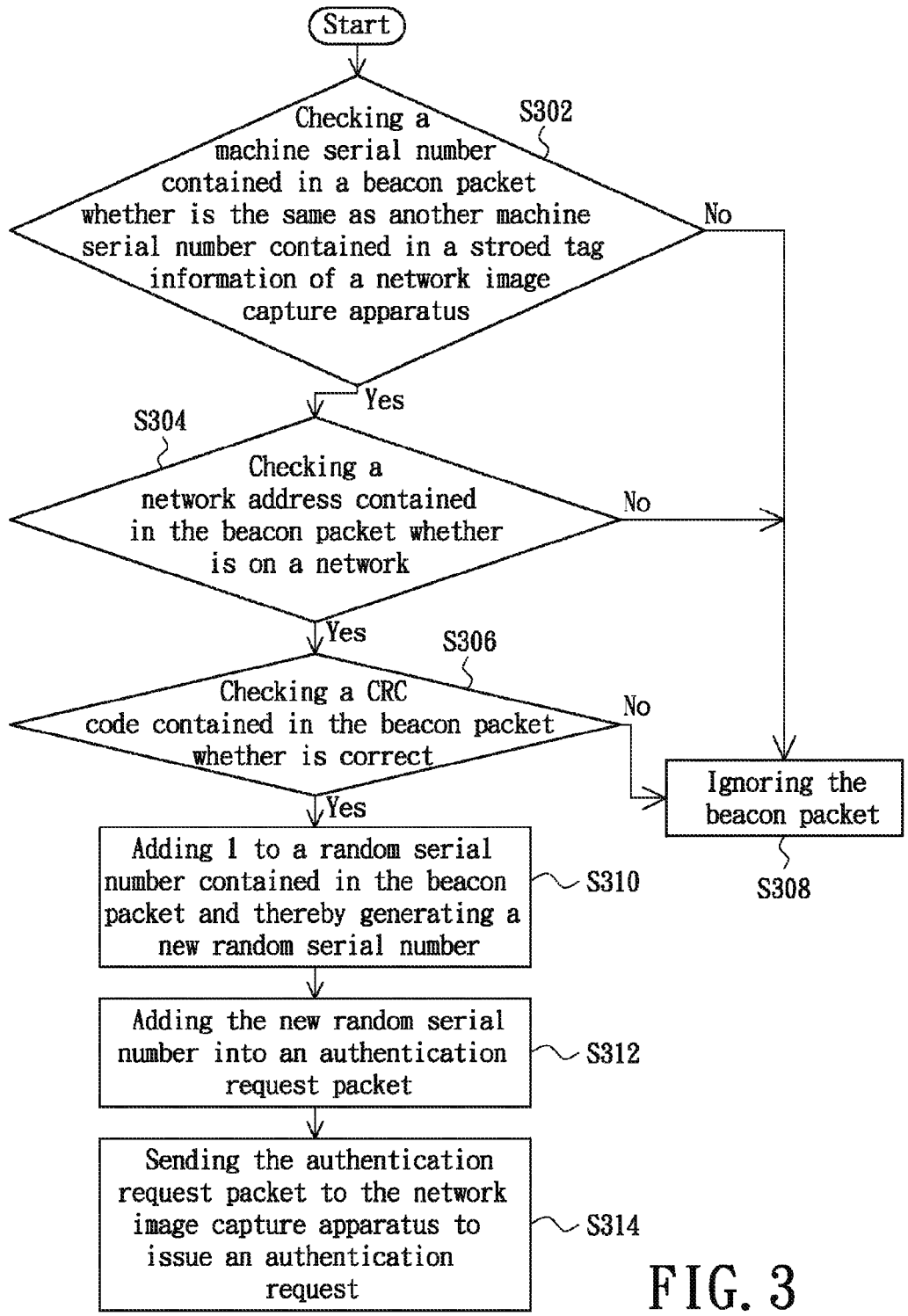
FIG. 3 shows a flow chart of a host apparatus processing a beacon packet according to a preferred embodiment of present invention.

FIG. 3 shows a flow chart of the host apparatus processing the beacon packet according to a preferred embodiment of present invention. Referring to FIGS. 2 and 3 together, after the host apparatus 102 obtains the beacon packet, the control module 202 firstly checks whether or not the machine serial numbers respectively contained in the beacon packet and in the tag information stored in the storage unit 206 are the same as mentioned in step S302. If the machine serial numbers respectively contained in the beacon packet and in the tag information stored in the storage unit 206 are checked to be different (i.e. "No" labeled on step S302), the beacon packet is ignored as described in step S308.

On the contrary, if the machine serial numbers respectively contained in the beacon packet and in the tag information stored in the storage unit 206 are checked to be the same (i.e. "Yes" labeled on step S302), the step S304 is performed to check whether or not the network address recorded in the beacon packet is on the network 106. If the network 106 doesn't have the network address recorded in the beacon packet (i.e. "No" labeled on the step S304), goes to the step 308. Whereas, if the network 106 has the network address recorded in the beacon packet (i.e. "Yes" labeled on the step S304), goes to the step S306 to check whether or not the CRC code is correct.

In the step S306, if the CRC code is checked to be incorrect (i.e. "No" labeled on step S306), goes to the step S308. On the contrary, if the CRC code is checked to be correct (i.e. "Yes" labeled on step S306), the step 310 is executed to add a predetermined value such as 1 to the random serial number contained in the beacon packet and thereby generate a new random serial number. In addition, as described in step S312, the new random serial number is added into an authentication request packet, and then the authentication request packet is sent back to the image capture apparatus 104 through the network 106 for issuing an authentication request. In this exemplary embodiment, the content of the authentication request packet contains the new random serial number, a host end random code and a CRC32 code.

Figure 4:
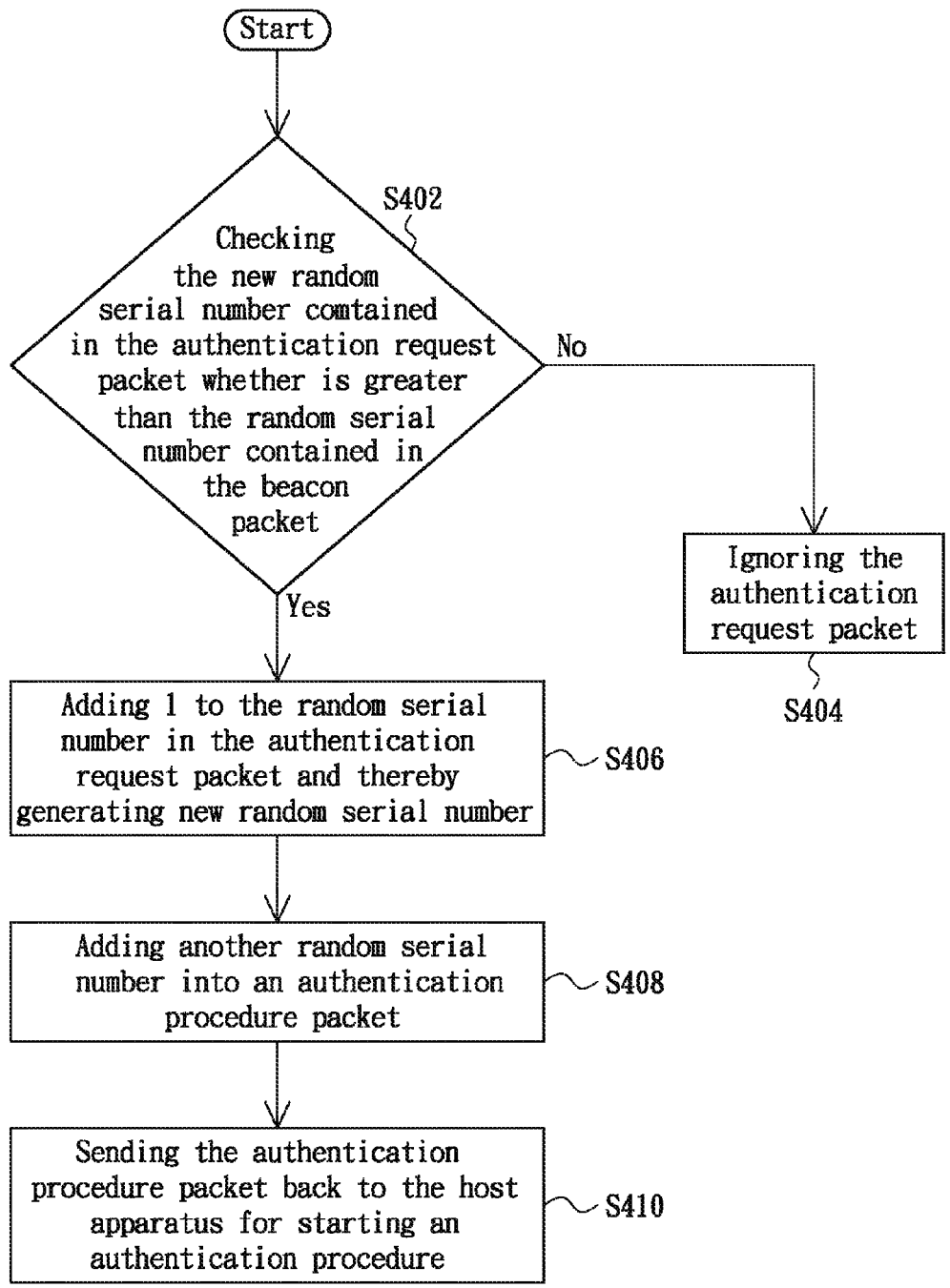
FIG. 4 shows a flow chart of an image capture apparatus processing an authentication request packet according to a preferred embodiment of the present invention.

FIG. 4 shows a flow chart of the image capture apparatus processing the authentication request packet according to a preferred embodiment of the present invention. Referring to FIGS. 2 and 4 together, when the image capture apparatus 104 obtains the authentication request packet through the network 106, the image capture apparatus 104 would firstly check the new random serial number contained in the authentication request packet whether is greater than the random serial number contained in the beacon packet, as mentioned in step S402. In other embodiment, the step S402 is changed to check whether or not the new random serial number contained in the authentication request packet is equal to a predetermined value instead.

If the checking result in the step S402 is that the random serial number contained in the authentication request packet is not greater than the random serial number contained in the beacon packet (i.e. "No" labeled on step S402), goes to the step S404 in which the authentication request packet is ignored. Therefore, if someone intercepts and records the beacon packet sent to the host apparatus 102 from the image capture apparatus 104 and provides a pseudo authentication request packet, the random serial number contained in the pseudo authentication request packet would be equal to rather than greater than the random serial number contained in the beacon packet. In this situation, the pseudo authentication request packet would be ignored and the purpose of improving information security is achieved consequently.

Back to the step S402, if the random serial number contained in the authentication request packet is greater than the random serial number contained in the beacon packet, goes to the step S406 to add a predetermined value such as 1 to the random serial number in the authentication request packet and thereby generate another new random serial number. Subsequently, the another new random serial number is added into an authentication procedure packet as described in step S408, and the authentication procedure packet then is sent back to the host apparatus 102 through the network 106 for starting an authentication procedure as described in step S410. In this exemplary embodiment, the authentication procedure packet contains the another new random serial number generated in the step S406, a random code of image capture apparatus end, a first authentication word stream and the CRC32 code. The first authentication word stream can be generated by arranging the random serial number in the authentication request packet, the random code of host end, the random code of image capture apparatus end, the security code, brand code and model number contained in the tag information, etc in an certain order.

Figure 5:
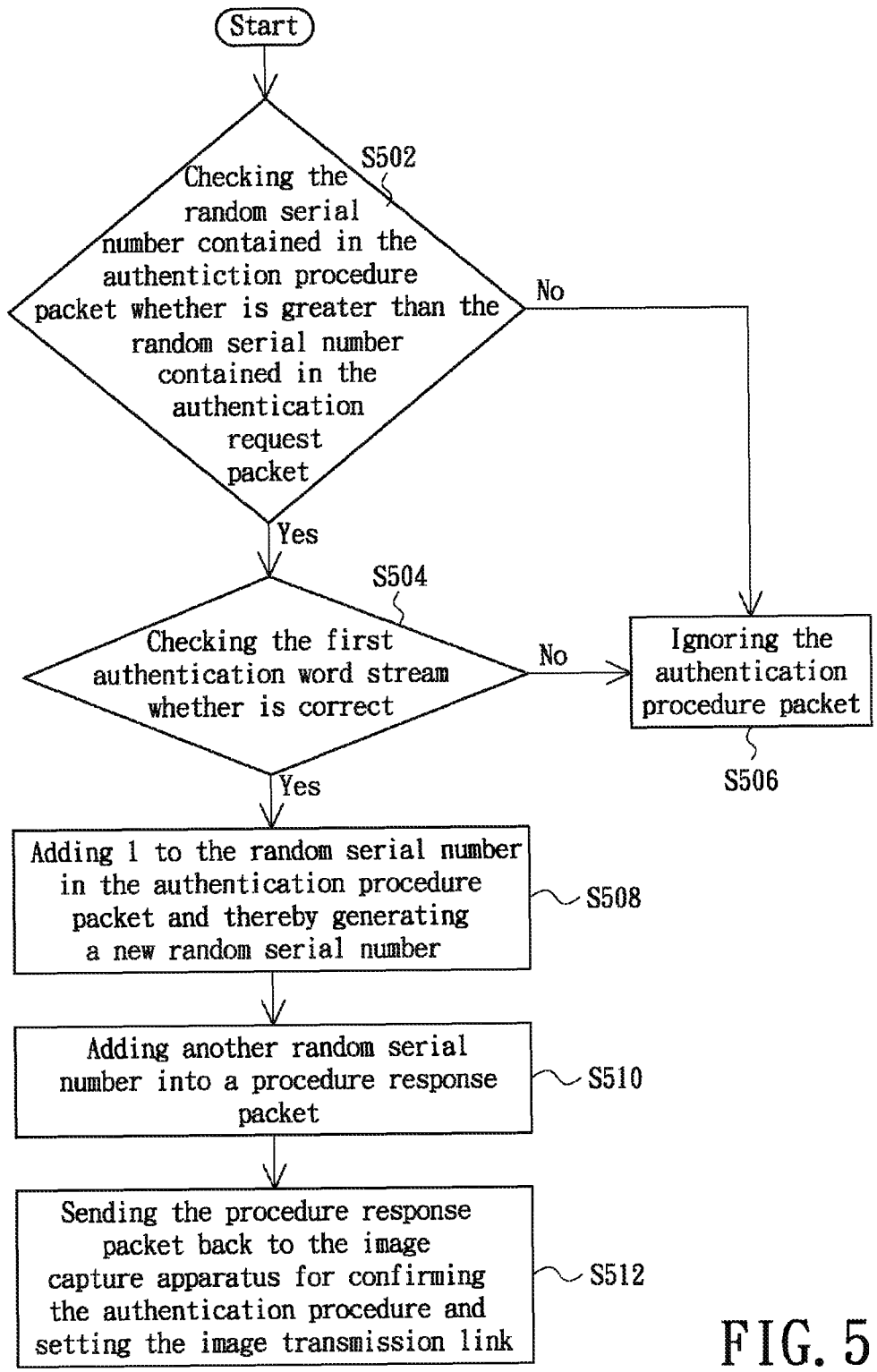
FIG. 5 shows a flow chart of a host apparatus dealing with an authentication procedure packet according to a preferred embodiment of the present invention.

FIG. 5 shows a flow chart of the host apparatus dealing with the authentication procedure packet according to a preferred embodiment of the present invention. Referring to FIGS. 2 and 5 together, when the host apparatus 102 receives the authentication procedure packet, as described in step S502 that checking whether or not the random serial number contained in the authentication procedure packet is greater than the random serial contained in the authentication request packet. If the random serial number contained in the authentication procedure packet is not greater than the random serial number contained in the authentication request packet (i.e. "No" labeled on step S502), goes to the step S506, in which the authentication procedure packet is ignored.

Whereas, if the random serial number contained in the authentication procedure packet is greater than random serial number contained in the authentication request packet in the step S502 (i.e. "Yes" labeled on step S502), goes to the step S504 to check whether or not the first authentication word stream is correct. Similarly, if the first authentication word stream contained in the authentication procedure packet is checked to be incorrect (i.e. "No" labeled on step S504), goes to the step S506. On the contrary, if the first authentication word stream is checked to be correct (i.e. "Yes" labeled on step S504), a predetermined value such as 1 is added to the random serial number contained in the authentication procedure packet and thereby generates a new random serial number, as mentioned in step S508. Subsequently, the new random serial number is added into a procedure response packet as the described in step S510, and then as described in the step S512 that the procedure response packet is sent back to the image capture apparatus 104 through the network 106 for confirming the authentication procedure. Furthermore, the host apparatus 102 can set the image transmission link according to the content of the beacon packet.

In this exemplary embodiment, the procedure response packet can contain the new random serial number generated in the step S508, a second authentication word stream and the CRC32 code. The second authentication word stream can be generated by arranging the random serial number contained in the authentication procedure packet, the random code of host end, the random code of image capture apparatus end, the security code, brand code and model number in the tag information in a certain order.

Figure 6:
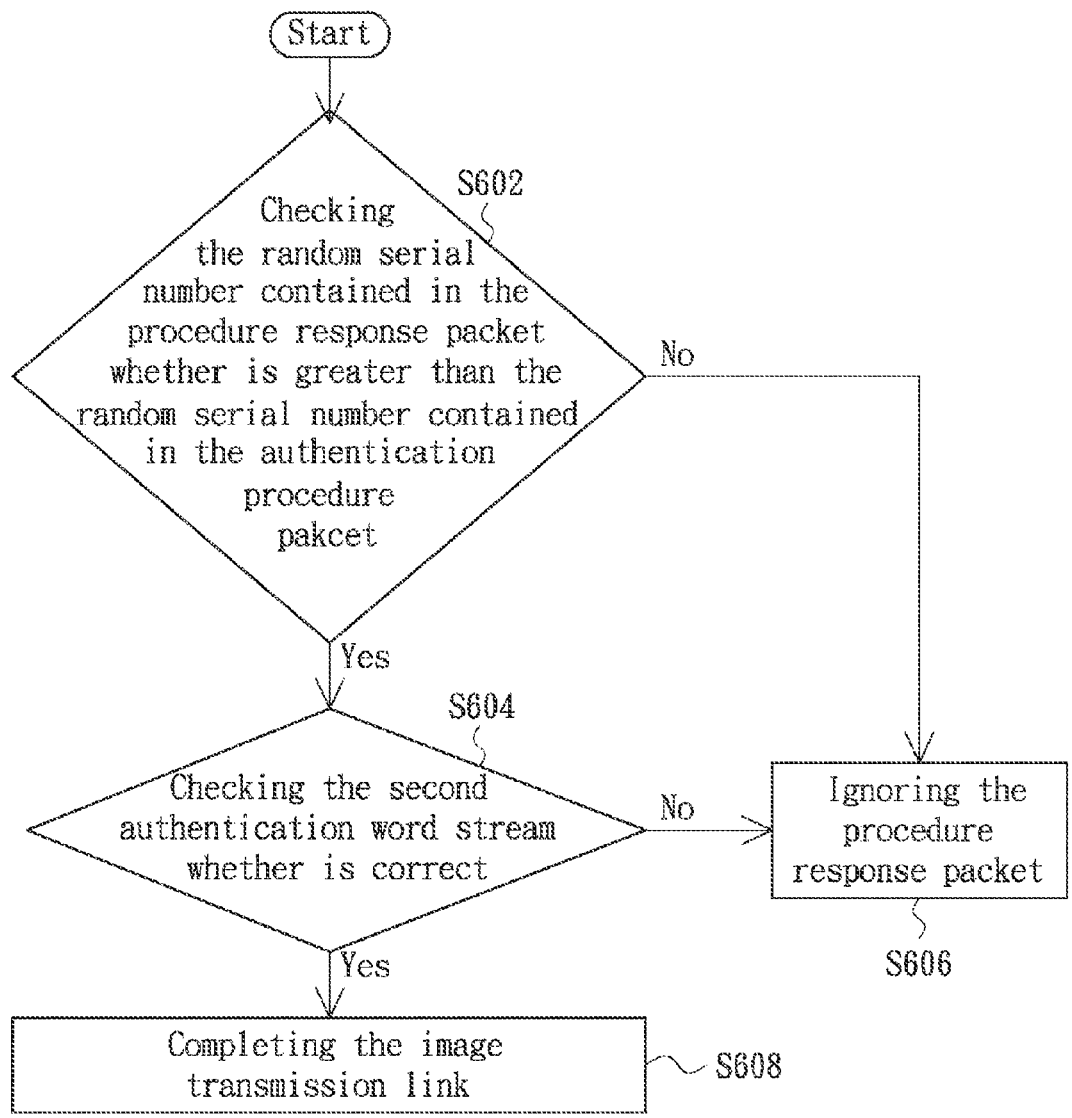
FIG. 6 shows a flow chart of an image capture apparatus dealing with a procedure response packet according to a preferred embodiment of the present invention.

FIG. 6 shows a flow chart of the image capture apparatus dealing with the procedure response packet according to a preferred embodiment of the present invention. Referring to FIGS. 2 and 6 together, when the image capture apparatus 104 receives the procedure response packet through the network 106, goes to the step S602 to check whether or not the random serial number contained in the procedure response packet is greater than the random serial number contained in the authentication procedure packet. If the random serial number contained in the procedure response packet is not greater than the random serial number contained in the authentication procedure packet (i.e. "No" labeled on step S602), goes to the step S606 in which the procedure response packet is ignored.

On the contrary, if the random serial number contained in the procedure response packet is greater than the random serial number contained in the authentication procedure packet in the step S602 (i.e. "Yes" labeled on step S602), the step S604 is carried out to check whether or not the second authentication word stream contained in the procedure response packet is correct. Similarly, if the second authentication word stream contained in the procedure response packet is checked to be incorrect (i.e. "No" labeled on step S604), the step S606 is executed. On the contrary, if the second authentication word stream is checked to be correct (i.e. "Yes" labeled on step S604), goes to the step S608 in which the image transmission link with the host apparatus 102 is completed.

Figure 7:
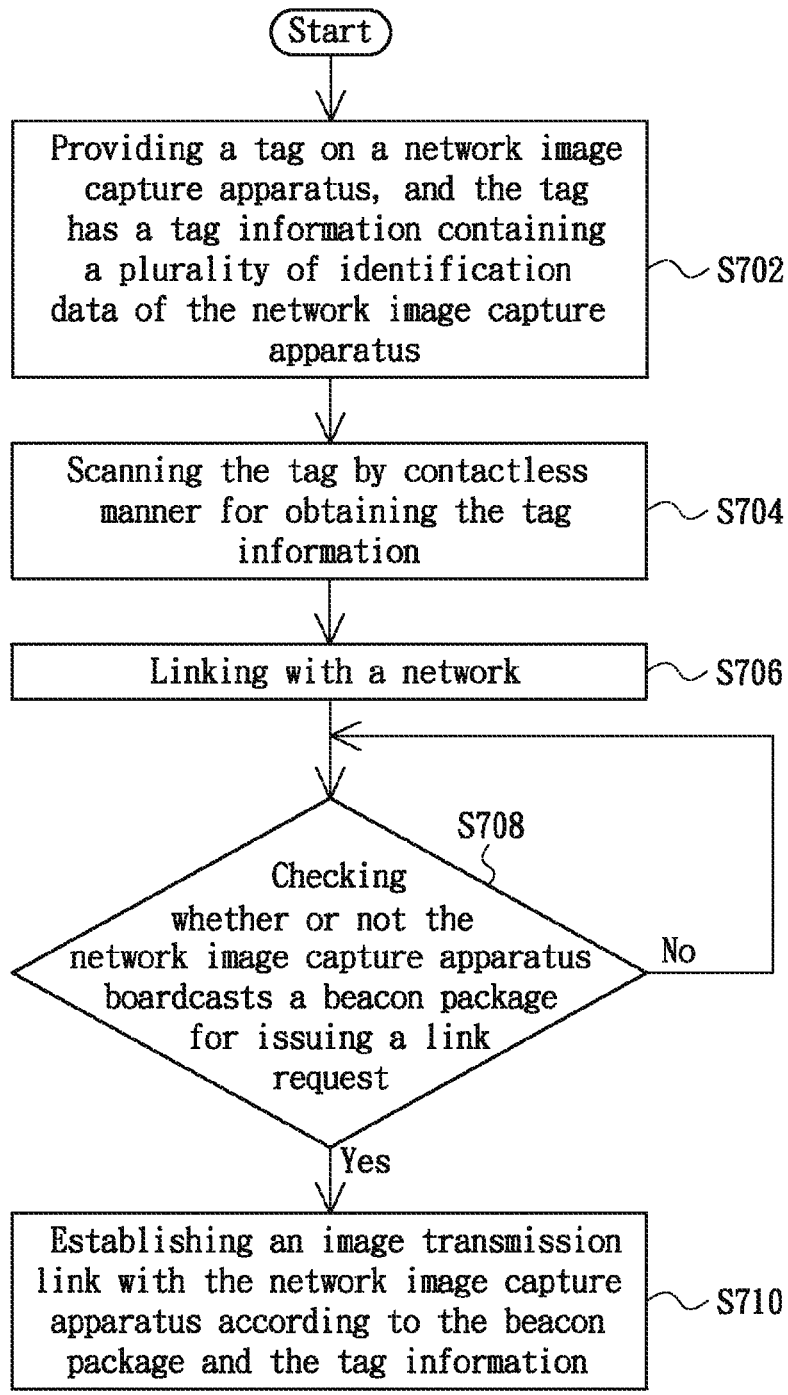
FIG. 7 shows a flow chart of a method for liking with a network image capture apparatus according to a preferred embodiment of the present invention.

FIG. 7 shows a flow chart of a method for liking with a network image capture apparatus according to a preferred embodiment of the present invention. As illustrated in FIG. 7, in this exemplary embodiment, the method of linking is adapted for a host apparatus such as a computer system or a network video recording apparatus. In particular, firstly as described in the step S702, a tag is provided on the network image capture apparatus such as a network camera, and the tag has a tag information containing a plurality of identification data of the network image capture apparatus, such as a network camera. Then, as mentioned in step S704, the tag is scanned in a contactless manner for obtaining the tag information. In addition, the step S706 also is performed to establish a link with a network.

Thereafter, goes to the step S708 to check whether or not the network camera has broadcasted a beacon packet on the network for issuing a link request. If it is checked to be that the network image capture apparatus has broadcasted the beacon packet on the network in the step S708 (i.e. "Yes" labeled on step S708), an image transmission link with the network image capture apparatus is established according to the beacon packet and the tag information as described in the step S710.

In summary, since the above embodiments of the present invention obtain the tag information of the tag disposed on the image capture apparatus in a contactless manner and then establish the image transmission link between the host apparatus and the image capture apparatus according to the tag information, the present invention can simplify the steps of link associated with the prior art. In addition, the present also can improve the information security While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A host apparatus adapted for linking with a tag scanner and an image capture apparatus, the host apparatus comprising:
   a control module;
   a data exchange interface module, for linking with the control module and the tag scanner, obtaining a tag information from a tag equipped on the image capture apparatus through the tag scanner and transmitting the obtained tag information to the control module;
   a storage unit, being coupled to the control module and for storing the tag information; and
   a link module, coupled to the control module and adapted for linking with a network, wherein when the image capture apparatus is linked with the network and broadcasts a beacon packet to the network, the link module obtains the beacon packet from the network and transmits the obtained beacon packet to the control module,
   the control module for controlling to establish an image transmission link between the host apparatus and the image capture apparatus at least according to a result of checking an identification data of the image capture apparatus contained in the beacon packet whether is matched with an identification data of the image capture apparatus contained in the tag information stored in the storage unit.

2. The host apparatus as claimed in claim 1, wherein the tag scanner is a barcode scanner, and the tag is a two-dimensional barcode.

3. The host apparatus as claimed in claim 1, wherein the tag scanner is a radio frequency identification reader, and the tag is a radio frequency identification tag.

4. The host apparatus as claimed in claim 1, wherein the identification data of the image capture apparatus contained in the beacon packet is a machine serial number of the image capture apparatus, and the identification data of the image capture apparatus contained in the tag information is a machine serial number of the image capture apparatus.

5. A method for linking with a network image capture apparatus, comprising:
   providing a tag on the network image capture apparatus, wherein the tag has a tag information containing a plurality of identification data of the network image capture apparatus;
   scanning the tag in a contactless manner to obtain the tag information;
   linking with a network; and
   when the network image capture apparatus is linked with the network and broadcasts a beacon packet to issue a link request, establishing an image transmission link with the image capture apparatus according to the beacon packet and the tag information;
   wherein the identification data comprise a machine serial number, a brand code, a model number and a security code of the network image capture apparatus.

6. The method as claimed in claim 5, wherein the step of scanning the tag in a contactless manner to obtain the tag information comprises:
   linking with the tag scanner through a data exchange interface; and
   reading the tag information through the tag scanner during the tag scanner scanning the tag.

7. The method as claimed in claim 6, wherein the data exchange interface is an universal serial bus interface.

8. A method for linking with a network image capture apparatus, comprising:
   providing a tag on the network image capture apparatus, wherein the tag has a tag information containing a plurality of identification data of the network image capture apparatus;
   scanning the tag in a contactless manner to obtain the tag information;
   linking with a network; and
   when the network image capture apparatus is linked with the network and broadcasts a beacon packet to issue a link request, establishing an image transmission link with the image capture apparatus according to the beacon packet and the tag information;
   wherein the beacon packet comprises a machine serial number of the network image capture apparatus, a network address, a first random serial number and a cyclic redundancy check code.

9. The method as claimed in claim 8, further comprising:
   checking the machine serial number contained in the beacon packet whether is matched with a machine serial number contained in the stored tag information;
   checking the network address whether is on the network, if the machine serial numbers respectively contained in the beacon packet and in the tag information are checked to be matched with each other;
   checking the cyclic redundancy check code whether is correct, if the network address is checked to be on the network;
   adding 1 to the first random serial number and thereby generating a second random serial number, if the cyclic redundancy check code is checked to be correct; and
   adding the second random serial number to an authentication request packet and sending the authentication request packet back to the network image capture apparatus, for issuing a authentication request to the network image capture apparatus.

10. The method as claimed in claim 9, wherein after the network image capture apparatus receives the authentication request, the method further comprises:
    checking the second random serial number whether is greater than the first random serial number; and
    starting an authentication procedure for establishing a link, if the second random serial number is checked to be greater than the first random serial number.

11. The method as claimed in claim 8, wherein the step of scanning the tag in a contactless manner to obtain the tag information comprises:
    linking with the tag scanner through a data exchange interface; and
    reading the tag information through the tag scanner during the tag scanner scanning the tag.

12. The method as claimed in claim 11, wherein the data exchange interface is an universal serial bus interface.

* * * * *